(12) United States Patent
Semitsu et al.

(10) Patent No.: US 11,189,038 B2
(45) Date of Patent: Nov. 30, 2021

(54) TRACKING APPARATUS AND COMPUTER READABLE MEDIUM

(71) Applicant: MITSUBISHI ELECTRIC CORPORATION, Tokyo (JP)

(72) Inventors: Takayuki Semitsu, Tokyo (JP); Takamasa Nakao, Tokyo (JP); Ryo Kikuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 59 days.

(21) Appl. No.: 16/834,015

(22) Filed: Mar. 30, 2020

(65) Prior Publication Data

US 2020/0226766 A1    Jul. 16, 2020

Related U.S. Application Data

(63) Continuation of application No. PCT/JP2018/031577, filed on Aug. 27, 2018.

(30) Foreign Application Priority Data

Nov. 21, 2017 (JP) .............................. JP2017-223642

(51) Int. Cl.
  *G06T 1/00* (2006.01)
  *G06T 7/246* (2017.01)
  *G06F 17/16* (2006.01)

(52) U.S. Cl.
  CPC .............. *G06T 7/246* (2017.01); *G06F 17/16* (2013.01); *G06T 2207/10016* (2013.01)

(58) Field of Classification Search
  CPC ........ G06N 20/00; G06N 5/04; G06N 99/005; G06K 9/00718; G06K 9/0014; G06K 9/40;

(Continued)

(56) References Cited

U.S. PATENT DOCUMENTS 8,705,793 B2    4/2014 Nevatia et al.
2015/0019161 A1    1/2015 Moriguchi et al.
(Continued)

FOREIGN PATENT DOCUMENTS

WO    WO 2013/128852 A1    9/2013
WO    WO 2014/112407 A1    7/2014

OTHER PUBLICATIONS

Enda et al.,"Robust Tracking Method to Intersections of Objects with Similar Patterns", IEEJ Transactions on Electronics, Information and Systems, vol. 130, No. 9, 2010, pp. 1588-1596, with English abstract.

(Continued)

*Primary Examiner* — Phuoc H Doan
(74) *Attorney, Agent, or Firm* — Birch, Stewart, Kolasch & Birch, LLP (57) ABSTRACT

A graph generation unit (21) generates a tracking graph by setting, as a node, each of a plurality of target objects detected in a plurality of frames constituting video data, and creating an edge between two consecutive frames to connect target objects. A vector calculation unit (22) calculates a velocity vector of a target object detected in a target frame, based on a correspondence between the target object detected in the target frame and a target object detected in a previous frame of the target frame. A cost calculation unit (23) calculates a cost of an edge connecting a target object in the target frame and a target object in a next frame of the target frame in the tracking graph. A correspondence determination unit (24) determines a correspondence between a target object in the target frame and a target object in the next frame, based on the tracking graph and the cost.

13 Claims, 8 Drawing Sheets

(58) Field of Classification Search
CPC .. G06K 9/6215; G06K 9/00463; G06T 7/248; G06T 3/40; G06T 5/20; G06T 3/4053; G06T 5/003
See application file for complete search history.

(56) References Cited

U.S. PATENT DOCUMENTS

2018/0330198 A1* 11/2018 Harary ............... G06K 9/00691
2019/0331484 A1   10/2019 Moriguchi et al.
2019/0331485 A1   10/2019 Moriguchi et al.
2021/0104014 A1*  4/2021 Kolb, V ................. G06T 5/003

OTHER PUBLICATIONS

International Search Report for International Application No. PCT/JP2018/031577, dated Nov. 20, 2018, with English translation.
Itoh et al., "Tracking of Soccer Players Using Time-Situation Graph in Monocular Image Sequence", Proceedings of IEICE, vol. J96-D, No. 8, Aug. 1, 2013, pp. 1854-1864.
Japanese Notice of Reasons for Refusal dated Nov. 20, 2018, for Japanese Application No. 2017-223642, with English translation.
Pirsiavash et al., "Globally-optimal greedy algorithms for tracking a variable number of objects.", IEEE Conference, Jun. 20-25, 2011, pp. 1201-1208.

* cited by examiner

TRACKING APPARATUS AND COMPUTER READABLE MEDIUM

CROSS REFERENCE TO RELATED APPLICATIONS

This application is a Continuation of PCT International Application No. PCT/JP2018/031577, filed on Aug. 27, 2018, which claims priority under 35 U.S.C. 119(a) to Patent Application No. 2017-223642, filed in Japan on Nov. 21, 2017, all of which are hereby expressly incorporated by reference into the present application.

TECHNICAL FIELD

The present invention relates to a technique for tracking a person detected in video data.

BACKGROUND ART

There is a tracking technique for tracking target objects such as persons captured in video data obtained by a camera device such as a surveillance camera. In the tracking technique, correspondences of target objects detected in a plurality of frames constituting the video data are determined between frames, so as to track the target objects.

One method of the tracking technique uses graph theory (refer to Non-Patent Literature 1). In the method using graph theory, target objects are tracked by solving a minimum cost flow problem, using, as a cost of an edge in a graph, information such as the probability of a detected object being a target object and the probability of target objects being identical between frames constituting the video data. To solve the minimum cost problem, costs of all edges included in the graph need to be known in advance.

CITATION LIST

Non-Patent Literature

[Non-Patent Literature 1] Pirsiavash, Hamed, Deva Ramanan, and Charless C. Fowlkes. "Globally-optimal greedy algorithms for tracking a variable number of objects." Computer Vision and Pattern Recognition (CVPR), 2011 IEEE Conference on. IEEE, 2011.

SUMMARY OF INVENTION

Technical Problem

In the existing tracking technique using graph theory, the costs of all edges included in the graph need to be known in advance. Therefore, the costs cannot be calculated taking into account previous movements of the target objects. For this reason, the costs are not set appropriately, and the target objects cannot be accurately tracked.

It is an object of the present invention to make it possible to accurately track a target object, using graph theory.

Solution to Problem

A tracking apparatus according to the present invention includes:
a graph generation unit to generate a tracking graph by setting, as a node, each of a plurality of target objects detected in a plurality of frames constituting video data, and creating an edge between two consecutive frames to connect target objects;
a vector calculation unit to calculate a velocity vector of a target object detected in a target frame among the plurality of frames, based on a correspondence between the target object detected in the target frame and a target object detected in a previous frame of the target frame;
a cost calculation unit to calculate a cost of an edge connecting a target object in the target frame and a target object in a next frame of the target frame in the tracking graph, based on the velocity vector calculated by the vector calculation unit; and
a correspondence determination unit to determine a correspondence between a target object in the target frame and a target object in the next frame, based on the tracking graph and the cost calculated by the cost calculation unit.

The cost calculation unit calculates the cost so as to assign a lower cost to an edge connected with a node that represents a target object in the next frame and that is closer to a position determined based on the velocity vector.

The correspondence determination unit determines the correspondence by selecting an edge with a low cost preferentially.

After the correspondence between the target object in the target frame and the target object in the next frame is determined, the vector calculation unit treats the next frame as a new target frame and calculates a velocity vector of the target object detected in the new target frame.

The vector calculation unit calculates an acceleration vector of the target object detected in the target frame.

The cost calculation unit calculates the cost of the edge based on the acceleration vector.

The cost calculation unit calculates the cost so as to assign a lower cost to an edge connected with a node that represents a target object in the next frame and that is closer to a position determined based on the velocity vector and the acceleration vector.

The correspondence determination unit determines the correspondence by selecting an edge with a low cost preferentially.

A tracking program according to the present invention causes a computer to execute:
a graph generation process to generate a tracking graph by setting, as a node, each of a plurality of target objects detected in a plurality of frames constituting video data, and creating an edge between two consecutive frames to connect target objects;
a vector calculation process to calculate a velocity vector of a target object detected in a target frame among the plurality of frames, based on a correspondence between the target object detected in the target frame and a target object detected in a previous frame of the target frame;
a cost calculation process to calculate a cost of an edge connecting a target object in the target frame and a target object in a next frame of the target frame in the tracking graph, based on the velocity vector calculated by the vector calculation process; and
a correspondence determination process to determine a correspondence between a target object in the target frame and a target object in the next frame, based on the tracking graph and the cost calculated by the cost calculation process.

Advantageous Effects of Invention

In the prevent invention, a velocity vector of a target object detected in a target frame is calculated based on a correspondence in the target frame and a previous frame, and a cost of an edge between the target frame and a next frame is calculated based on the calculated velocity vector. Then, a correspondence in the target frame and the next frame is determined based on the calculated cost. The cost is calculated taking into account a previous movement of the target object, so that the target object can be accurately tracked.

DESCRIPTION OF EMBODIMENTS

First Embodiment

Description of Configuration

A configuration of a tracking apparatus 10 according to a first embodiment will be described with reference to FIG. 1.

The tracking apparatus 10 includes hardware of a processor 11, a memory 12, a storage 13, and a communication interface 14. The processor 11 is connected with other hardware components via signal lines and controls these other hardware components.

The processor 11 is an integrated circuit (IC) that performs processing. As a specific example, the processor 11 is a central processing unit (CPU), a digital signal processor (DSP), or a graphics processing unit (GPU).

The memory 12 is a storage device to temporarily store data. As a specific example, the memory 12 is a static random access memory (SRAM) or a dynamic random access memory (DRAM).

The storage 13 is a storage device to store data. As a specific example, the storage 13 is a hard disk drive (HDD). Alternatively, the storage 13 may be a portable recording medium, such as a Secure Digital (SD) memory card, CompactFlash (CF, registered trademark), a NAND flash, a flexible disk, an optical disc, a compact disc, a Blu-ray (registered trademark) disc, or a digital versatile disc (DVD).

The communication interface 14 is an interface for communicating with an external device. As a specific example, the communication interface 14 is an Ethernet (registered trademark) port, a Universal Serial Bus (USB, registered trademark) port, or a High-Definition Multimedia Interface (HDMI, registered trademark) port.

The tracking apparatus 10 is connected with a camera device 141 and a display device 142 via the communication interface 14.

The tracking apparatus 10 includes, as functional components, a graph generation unit 21, a vector calculation unit 22, a cost calculation unit 23, and a correspondence determination unit 24. The functions of the functional components of the tracking apparatus 10 are realized by software.

The storage 13 stores programs for realizing the functions of the functional components of the tracking apparatus 10. These programs are loaded by the processor 11 into the memory 12 and executed by the processor 11. This realizes the functions of the functional components of the tracking apparatus 10.

Figure 1:
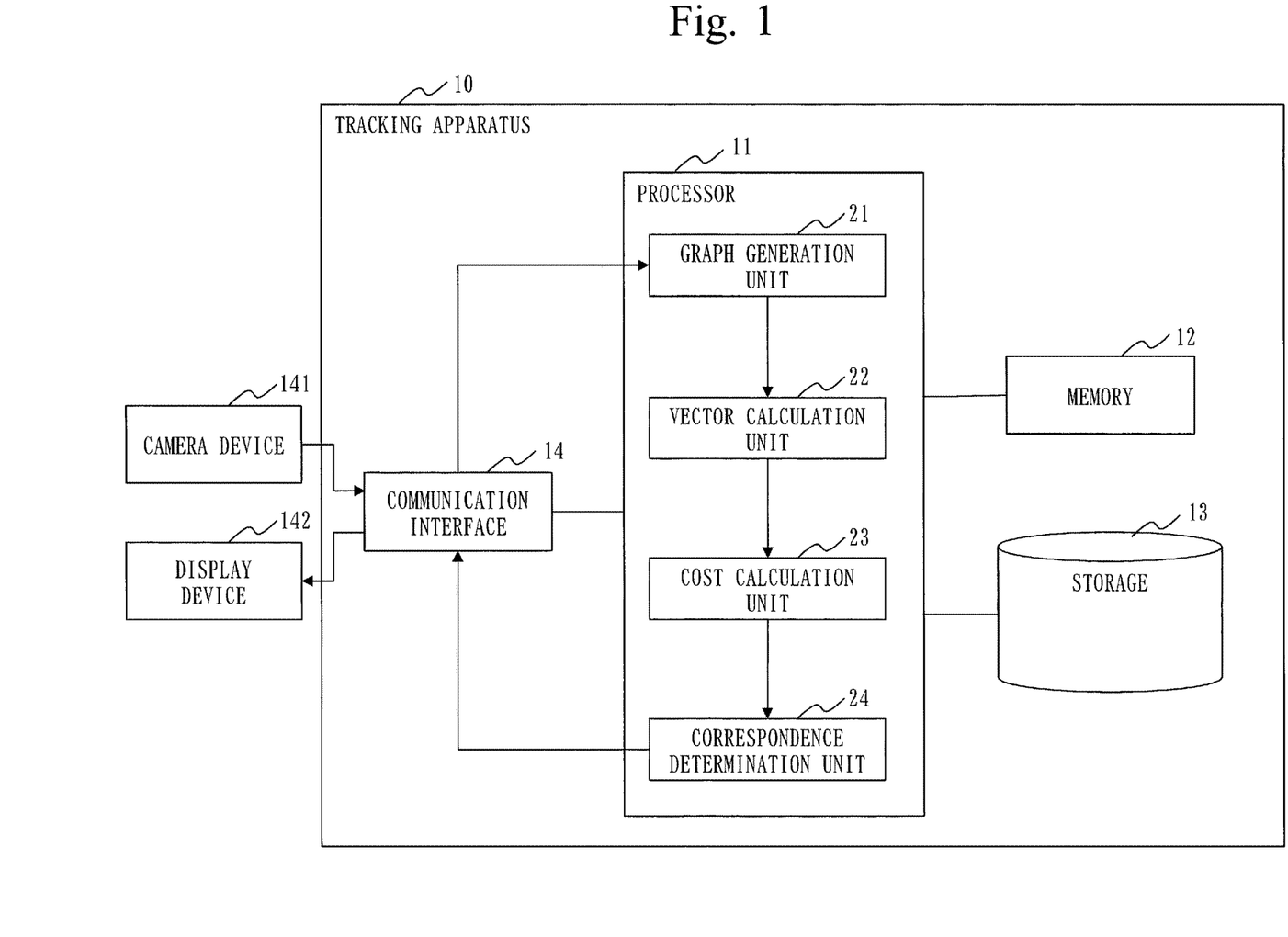
FIG. 1 is a configuration diagram of a tracking apparatus 10 according to a first embodiment.

FIG. 1 illustrates only one processor 11. However, a plurality of processors 11 may be included, and the plurality of processors 11 may cooperate to execute the programs for realizing the functions.

Description of Operation

Operation of the tracking apparatus 10 according to the first embodiment will be described with reference to FIGS. 2 to 6.

The operation of the tracking apparatus 10 according to the first embodiment corresponds to a tracking method according to the first embodiment. The operation of the tracking apparatus 10 according to the first embodiment also corresponds to processes of a tracking program according to the first embodiment.

The overall operation of the tracking apparatus 10 according to the first embodiment will be described with reference to FIG. 2.

This description assumes that a correspondence between target objects 32 is determined in frames 31 in order of earlier to later frames in time. In the following description, therefore, a next frame 31 of a given frame 31 is a frame 31 immediately following the given frame 31 in time, and a previous frame 31 of the given frame 31 is a frame 31 immediately preceding the given frame 31 in time.

However, a correspondence between target objects 32 may be determined in frames 31 in order of later to earlier frames in time. In this case, a next frame 31 of a given frame 31 is a frame 31 immediately preceding the given frame 31 in time, and a previous frame 31 of the given frame 31 is a frame 31 immediately following the given frame 31 in time.

Figure 2:
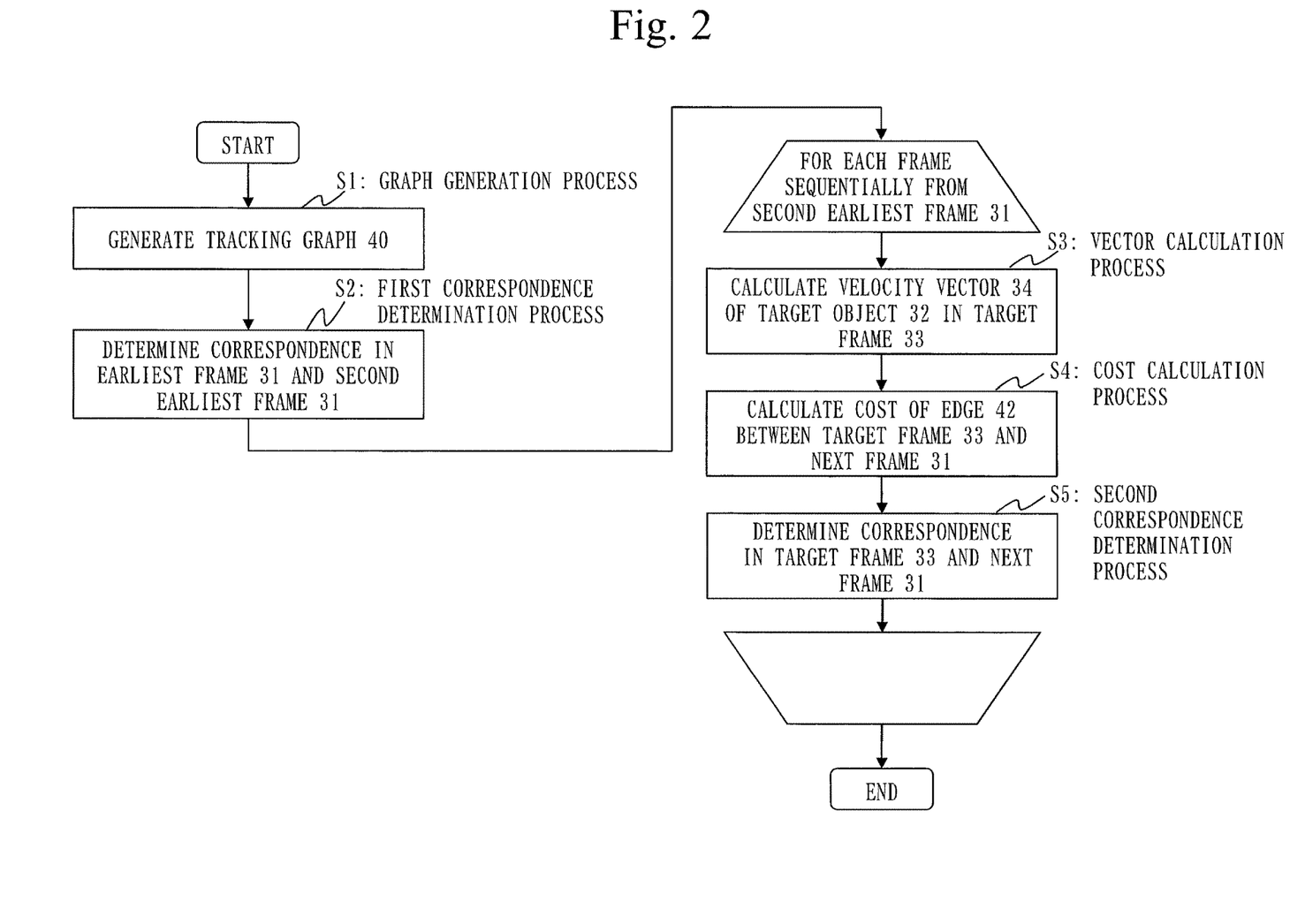
FIG. 2 is a flowchart of overall operation of the tracking apparatus 10 according to the first embodiment.

(Step S1 of FIG. 2: Graph Generation Process)

The graph generation unit 21 generates a tracking graph 40 by setting, as a node 41, each of a plurality of target objects 32 detected in a plurality of frames 31 constituting video data 30 and creating an edge 42 between two consecutive frames 31 to connect target objects 32.

Figure 3:
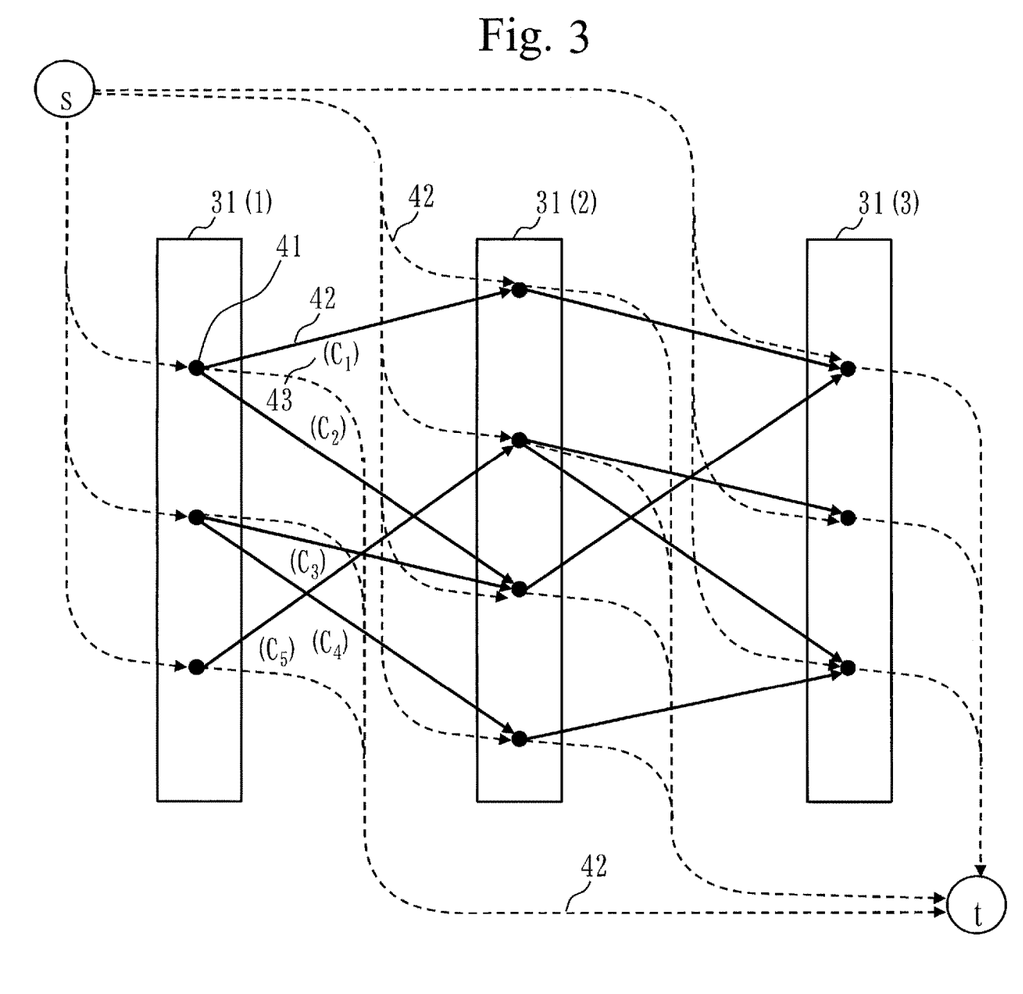
FIG. 3 is a diagram describing a tracking graph 40 according to the first embodiment.

Specifically, the graph generation unit 21 acquires the video data 30 from the camera device 141 via the communication interface 14. The graph generation unit 21 extracts target objects 32 such as persons from the frames 31 constituting the acquired video data 30. A target object 32 is not limited to a person, and may be an object such as a bag. The graph generation unit 21 generates the tracking graph 40 by setting the extracted target objects 32 as nodes 41 and creating edges 42 between nodes 41 to connect target objects 32 between two consecutive frames, as illustrated in FIG. 3. The graph generation unit 21 also creates a node s for starting and a node t for termination, and creates edges 42 between the node s and each node 41 and between the node t and each node 41. With respect to each edge 42, the graph generation unit 21 calculates a cost 43 of the edge 42 concerned based on, for example, the degree of matching between the features of the target objects 32 represented by two nodes 41 connected by the edge 42 concerned. The graph generation unit 21 assigns the calculated cost 43 to the edge 42 concerned. The graph generation unit 21 writes the tracking graph 40 in which the cost 43 is assigned to each edge 42 into the memory 12.

Figure 4:
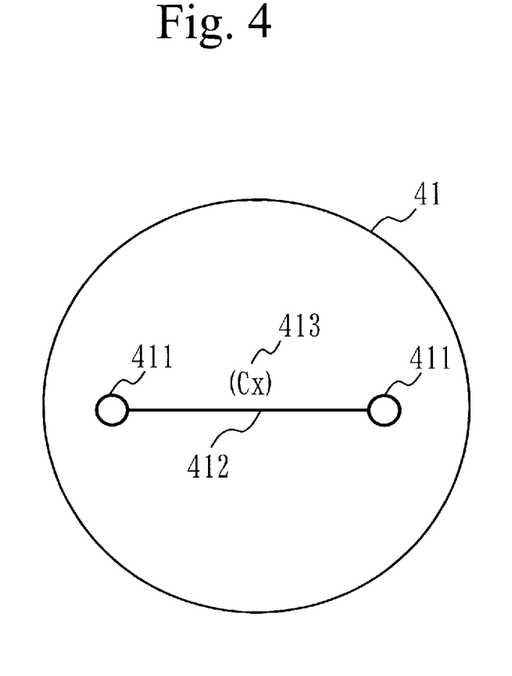
FIG. 4 is a diagram illustrating a different example of a node 41 according to the first embodiment.

The graph generation unit 21 may represent each node 41 as two nodes 411 and an edge 412 connecting the two nodes 411, as illustrated in FIG. 4. Then, the graph generation unit 21 may assign to the edge 412 a cost 413 calculated based on, for example, the probability of the node 41 representing the target object 32.

(Step S2: First correspondence determination process)

The correspondence determination unit 24 determines a correspondence between a target object 32 in the frame 31 that is the earliest in time and a target object 32 in the frame 31 that is the second earliest in time.

Specifically, the correspondence determination unit 24 retrieves the tracking graph 40 from the memory 12. The correspondence determination unit 24 solves a shortest path problem from the node s to the node t for up to the frame 31 that is the second earliest in time, using dynamic programming. In dynamic programming, the shortest path is determined in one direction in time. Dynamic programming is described in Non-Patent Literature 1, for example. The correspondence determination unit 24 determines that the target objects 32 connected by the determined path correspond to each other. The correspondence determination unit 24 writes the determined correspondence into the memory 12.

Processes of steps S3 to S5 described below are executed for each frame 31 sequentially from the frame 31 that is the second earliest to the frame 31 that is the latest in time.

(Step S3: Vector Calculation Process)

Based on the correspondence between the target object 32 detected in a target frame 33 among the plurality of frames 31 and the target object 32 detected in the previous frame 31 of the target frame 33, the vector calculation unit 22 calculates a velocity vector 34 of the target object 32 detected in the target frame 33.

Figure 5:
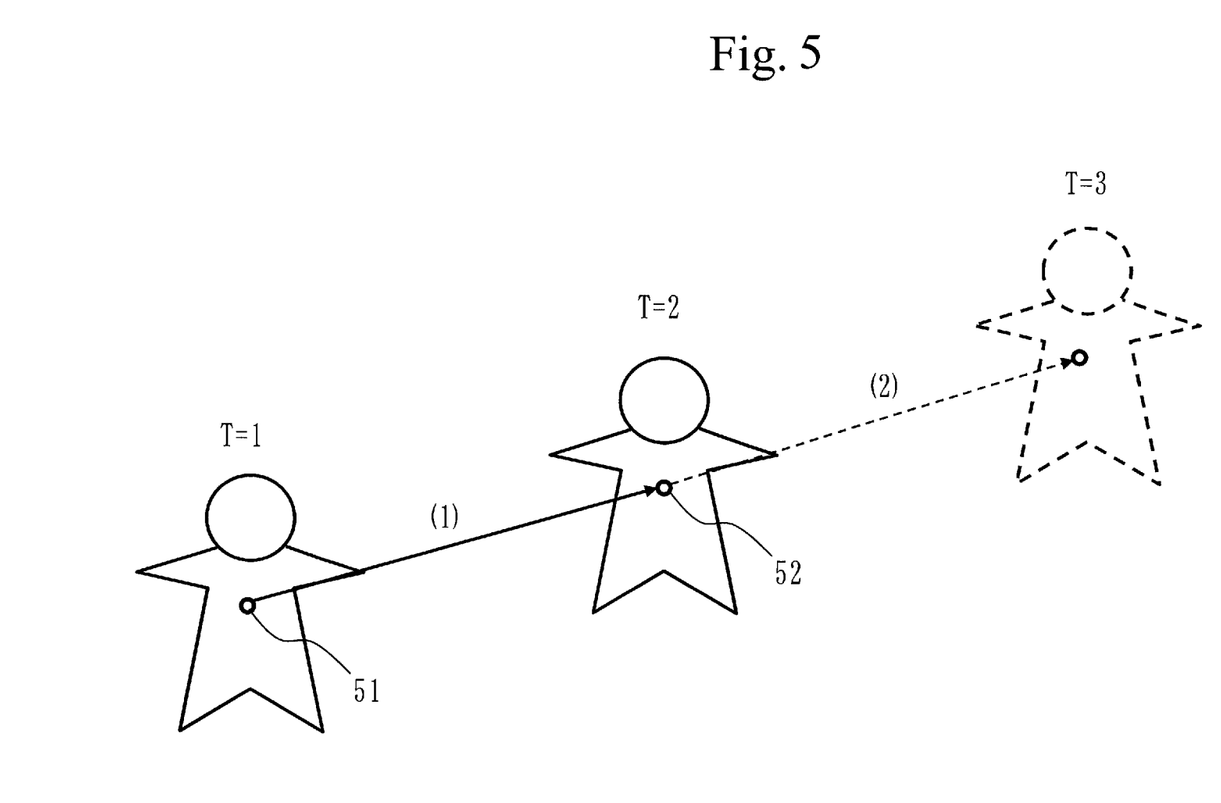
FIG. 5 is a diagram describing a velocity vector 34 according to the first embodiment.

Specifically, the vector calculation unit 22 retrieves from the memory 12 the correspondence between the target object 32 detected in the target frame 33 and the target object 32 detected in the previous frame 31 of the target frame 33. The vector calculation unit 22 calculates the velocity vector 34 of the target object 32 on the assumption that the target object 32 has moved from the position of the target object 32 in the previous frame 31 to the position of the target object 32 in the target frame 33 as indicated by the retrieved correspondence. That is, the vector calculation unit 22 calculates the velocity vector 34 that indicates that the target object 32 moves, per frame 31, by a distance from a position 51 of the target object 32 in the previous frame 31 to a position 52 of the target object 32 in the target frame 33 and in a direction from the position 51 to the position 52, as illustrated in FIG. 5. That is, the vector calculation unit 22 calculates the velocity vector 34 that indicates that the target object 32 also moves from the point at T=2 to the point at T=3 by the same distance as the distance from the point at T=1 to the point at T=2 and in a direction (2) that is the same as a direction (1) in FIG. 5. The vector calculation unit 22 writes the calculated velocity vector 34 into the memory 12.

(Step S4: Cost Calculation Process)

The cost calculation unit 23 re-calculates the cost 43 of each edge 42 connecting the target object 32 in the target frame 33 and the target object 32 in the next frame 31 of the target frame 33 in the tracking graph 40, based on the velocity vector 34 calculated in step S3.

Specifically, the cost calculation unit 23 re-calculates the cost 43 such that a lower cost is assigned to the edge 42 connected with the node 41 that represents the target object 32 in the next frame 31 and that is closer to the position determined based on the velocity vector 34. The cost calculation unit 23 updates the cost 43 of each edge 42 for which re-calculation has been performed with the re-calculated cost 43, among the costs 43 written in the memory 12 in step S1.

For example, with respect to each edge 42 connecting the target object 32 in the target frame 33 and the target object 32 in the next frame 31 of the target frame 33, the cost calculation unit 23 assigns a value X to the edge 42 concerned such that a lower value X is assigned to the edge 42 connected with the node 41 closer to the position determined based on the velocity vector 34. Then, with respect to each edge 42 connecting the target object 32 in the target frame 33 and the target object 32 in the next frame 31 of the target frame 33, the cost calculation unit 23 re-calculates the cost 43 by weighting the assigned value X and the cost 43 calculated in step S1 and then calculating the sum of the weighted value X and the weighted cost 43. That is, the cost calculation unit 23 re-calculates the cost 43 by $Z=\alpha X+\beta Y$, where Y is the cost 43 calculated in step S1, Z is the cost 43 to be re-calculated, and $\alpha$ and $\beta$ are the weights ($\alpha+\beta=1$).

(Step S5: Second Correspondence Determination Process)

The correspondence determination unit 24 determines a correspondence between the target object 32 in the target frame 33 and the target object 32 in the next frame 31, based on the tracking graph 40 and the costs 43 re-calculated in step S4.

Specifically, the correspondence determination unit 24 retrieves from the memory 12 the tracking graph 40 in which the re-calculated costs 43 are assigned. The correspondence determination unit 24 solves the shortest path problem from the node s to the node t for up to the next frame 31 of the target frame 33 in a forward direction in time, using dynamic programming. Note that the paths from the frame 31 that is the earliest in time to the target frame 33 have been calculated by the processes of step S2 and previously performed step S5. Therefore, a path from the target frame 33 to the next frame 31 is calculated here. The correspondence determination unit 24 determines that the target object 32 in the target frame 33 and the target object 32 in the next frame 31 that are connected by the determined path correspond to each other. The correspondence determination unit 24 writes the determined correspondence into the memory 12. The correspondence determination unit 24 may output the determined correspondence to the display device 142, so as to be displayed.

Effects of First Embodiment

As described above, the tracking apparatus 10 according to the first embodiment calculates the cost 43 of the edge 42 in the tracking graph 40, using the velocity vector 34. Therefore, the cost 43 that is appropriate taking into account the previous movement of the target object 32 can be assigned to the edge 42. As a result, the target object 32 can be accurately tracked.

In the tracking technique using graph theory, target objects are tracked by solving the minimum cost flow problem. Therefore, costs of all edges need to be determined in advance.

However, the tracking apparatus 10 according to the first embodiment determines paths sequentially in one direction in time, using dynamic programming. This allows the cost 43 of the edge 42 that forms a path calculated later to be re-calculated using information on the paths already calculated. That is, the appropriate cost 43 taking into account the previous movement of the target object 32 can be assigned to the edge 42.

Figure 6:
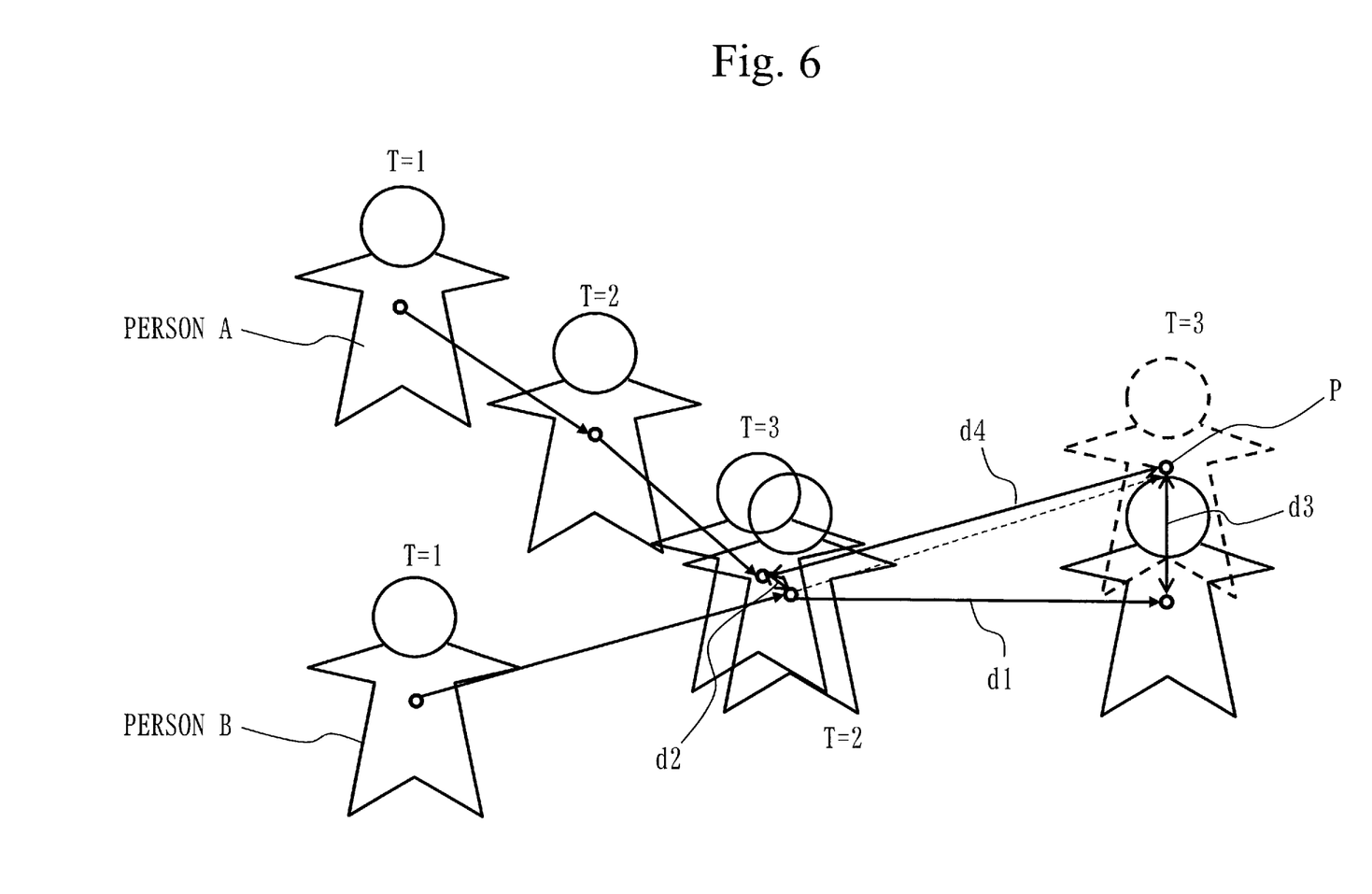
FIG. 6 is a diagram describing effects of the first embodiment.

It is assumed that a person A and a person B are captured as target objects in the video data 30, as illustrated in FIG. 6.

Note that the position of the person A at time T=3 and the position of the person B at time T=2 are close to each other. If the velocity vector 34 is not used as is the case in the existing technique, objects located close to each other tend to be determined as corresponding to each other, so that the person B at time T=2 and the person A at time T=3 may be determined as corresponding to each other. That is, a shorter one of a distance d1 and a distance d2 from the position of the person B at time T=2 may take precedence, and the person B at time T=2 and the person A at time T=3 may be determined as corresponding to each other.

However, the tracking apparatus 10 according to the first embodiment calculates the cost 43 taking into account the velocity vector 34. Therefore, the person B at time T=3 located closer to a predicted position P of the person B at time T=3 indicated by the velocity vector 34 is determined as corresponding to the person B at time T=2. That is, a shorter one of a distance d3 and a distance d4 from the predicted position P of the person B at time T=3 takes precedence, and the person B at time T=3 is determined as corresponding to the person B at time T=2.

By thus calculating the cost 43 taking into account the velocity vector 34, the smoothness of a movement trajectory, that is, the movement at the same velocity in the same direction can be added to the criteria for tracking.

Other Configuration

First Variation

In the first embodiment, the functional components are realized by software. As a first variation, however, the functional components may be realized by hardware. With respect to the first variation, differences from the first embodiment will be described.

Figure 7:
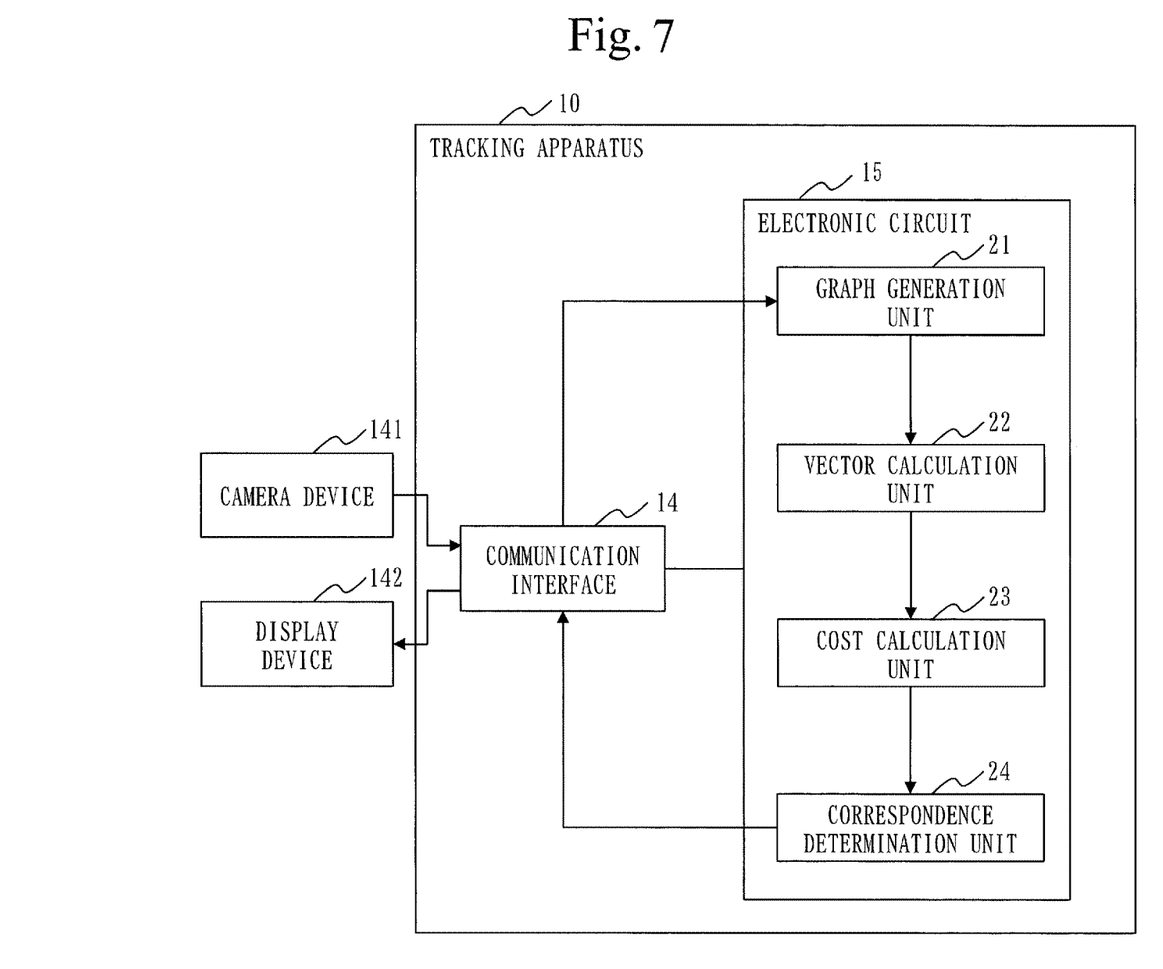
FIG. 7 is a configuration diagram of the tracking apparatus 10 according to a first variation.

A configuration of the tracking apparatus 10 according to the first variation will be described with reference to FIG. 7.

When the functional components are realized by hardware, the tracking apparatus 10 includes an electronic circuit 15, in place of the processor 11, the memory 12, and the storage 13. The electronic circuit 15 is a dedicated circuit that realizes the functions of the functional components, the memory 12, and the storage 13.

The electronic circuit 15 is assumed to be a single circuit, a composite circuit, a programmed processor, a parallel-programmed processor, a logic IC, a gate array (GA), an application-specific integrated circuit (ASIC), or a field-programmable gate array (FPGA).

The functional components may be realized by one electronic circuit 15, or the functional components may be distributed among and realized by a plurality of electronic circuits 15.

Second Variation

As a second variation, some of the functional components may be realized by hardware, and the rest of the functional components may be realized by software.

Each of the processor 11, the memory 12, the storage 13, and the electronic circuit 15 is referred to as processing circuitry. That is, the functions of the functional components are realized by the processing circuitry.

Second Embodiment

A second embodiment differs from the first embodiment in that the cost 43 is calculated taking into account an acceleration vector 35 that indicates a change in the velocity vector 34, in addition to the velocity vector 34 or in place of the velocity vector 34.

Description of Operation

Operation of the tracking apparatus 10 according to the second embodiment will be described with reference to FIG. 2.

The operation of the tracking apparatus 10 according to the second embodiment corresponds to the tracking method according to the second embodiment. The operation of the tracking apparatus 10 according to the second embodiment also corresponds to processes of the tracking program according to the second embodiment.

The following describes processes when the cost 43 is calculated taking into account the acceleration vector 35 in addition to the velocity vector 34.

The processes of steps S1 and S2 and the process of step S5 are the same as those of the first embodiment.

(Step S3: Vector Calculation Process)

When the target frame 33 is the frame 31 that is the second earliest in time, the vector calculation unit 22 calculates the velocity vector 34 as described in the first embodiment. When the target frame 33 is the frame 31 that is the third earliest or later in time, the vector calculation unit 22 calculates not only the velocity vector 34 but also the acceleration vector 35.

The calculation of the velocity vector 34 can be done when a correspondence in two frames 31 is known. However, the calculation of the acceleration vector 35 requires a correspondence in three frames 31. Therefore, when the target frame 33 is the frame 31 that is the second earliest in time, the acceleration vector 35 cannot be calculated.

(Step S4: Cost Calculation Process)

The cost calculation unit 23 re-calculates the cost 43 taking into account the velocity vector 34 and also taking into account the acceleration vector 35 when the acceleration vector 35 is calculated in step S3. Specifically, the cost calculation unit 23 re-calculates the cost 43 such that a lower cost is assigned to the edge 42 connected with the node 41 that represents the target object 32 in the next frame 31 and that is closer to the position determined based on the velocity vector 34 and the acceleration vector 35.

As described above, the tracking apparatus 10 according to the second embodiment calculates the cost 43 taking into account the acceleration vector 35. Therefore, the cost 43 that is more appropriate can be assigned to the edge 42. As a result, the target object 32 can be accurately tracked.

Specifically, when the target object 32 moves at constant acceleration, the target object 32 can be accurately tracked. As a specific example, when the target object 32 makes a movement forming a parabola, this is the movement at constant acceleration. Taking a curve forms a nearly parabolic trajectory.

Figure 8:
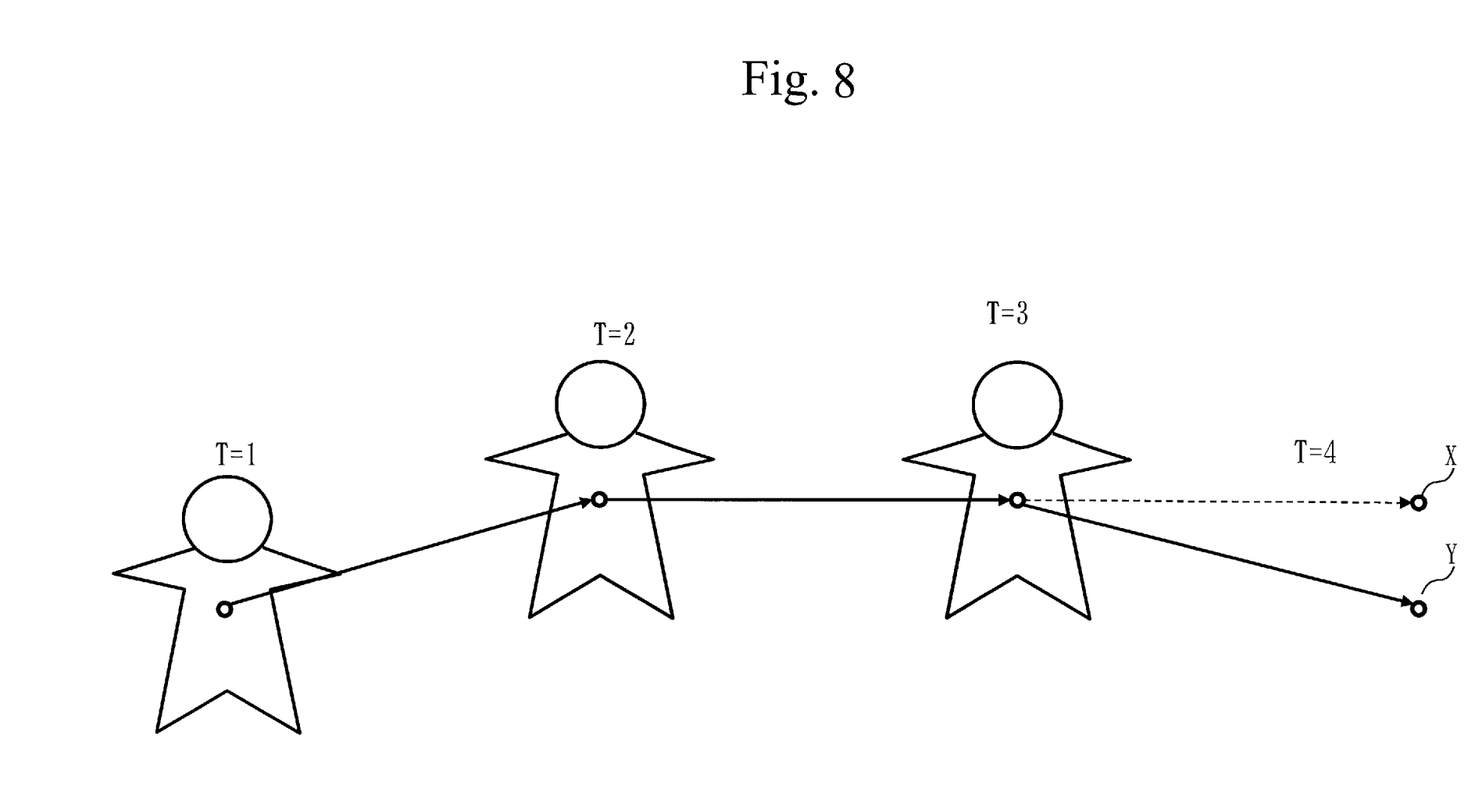
FIG. 8 is a diagram describing effects of a second embodiment.

For example, as illustrated in FIG. 8, when only the velocity vector 34 is taken into account, the cost 43 is calculated based on a predicted position X indicated by the velocity vector 34 calculated based on the positions at T=2 and T=3. However, when the acceleration vector 35 is also taken into account, the cost 43 is calculated based on a predicted position Y indicated by the velocity vector 34 calculated based on the positions at T=2 and T=3 and the acceleration vector 35 calculated based on the positions at T=1, T=2, and T=3. Therefore, when a movement at constant acceleration is made, taking into account the acceleration vector 35 makes a predicted position closer to the actual position, thereby reducing the cost 43. Therefore, the probability of a correct correspondence being determined is increased.

Third Variation

In the second embodiment, the cost 43 is calculated taking into account the acceleration vector 35 that indicates a change in the velocity vector 34. However, the acceleration vector 35 is not limiting, and the cost 43 may be calculated taking into account a vector representing a change in the acceleration vector 35, for example.

REFERENCE SIGNS LIST

10: tracking apparatus, 11: processor, 12: memory, 13: storage, 14: communication interface, 15: electronic circuit, 21: graph generation unit, 22: vector calculation unit, 23: cost calculation unit, 24: correspondence determination unit, 30: video data, 31: frame, 32: target object, 33: target frame, 34: velocity vector, 35: acceleration vector, 40: tracking graph, 41: node, 411: node, 412: edge, 413: cost, 42: edge, 43: cost

The invention claimed is:

1. A tracking apparatus comprising:
processing circuitry to:
generate a tracking graph by setting, as a node, each of a plurality of target objects detected in a plurality of frames constituting video data, creating an edge between two consecutive frames to connect target objects, creating an edge between a node representing a target object detected in an earliest frame and a start node s, creating an edge between a node representing a target object detected in a last frame and a termination node t, and with respect to each edge, calculating a cost of the edge concerned based on a degree of matching between target objects represented by two nodes connected by the edge concerned;
determine a correspondence between a target object detected in the earliest frame and a target object detected in a next frame of the earliest frame by solving a shortest path problem from the start node s to the termination node t in the generated tracking graph;
calculate a velocity vector of a target object detected in a target frame, based on a correspondence between the target object detected in the target frame and a target object detected in a previous frame of the target frame, the target frame being each frame of the plurality of frames starting from the next frame and in a chronological order;
calculate a cost of an edge connecting a target object in the target frame and a target object in a next frame of the target frame in the tracking graph, based on the calculated velocity vector; and
determine a correspondence between a target object in the target frame and a target object in the next frame, based on the tracking graph and the calculated cost.

2. The tracking apparatus according to claim 1,
wherein the processing circuitry calculates the cost so as to assign a lower cost to an edge connected with a node that represents a target object in the next frame and that is closer to a position determined based on the velocity vector, and
determines the correspondence by selecting an edge with a low cost preferentially.

3. The tracking apparatus according to claim 2,
wherein after the correspondence between the target object in the target frame and the target object in the next frame is determined, the processing circuitry treats the next frame as a new target frame and calculates a velocity vector of the target object detected in the new target frame.

4. The tracking apparatus according to claim 3,
wherein the processing circuitry calculates an acceleration vector of the target object detected in the target frame, and
calculates the cost of the edge based on the acceleration vector.

5. The tracking apparatus according to claim 4,
wherein the processing circuitry calculates the cost so as to assign a lower cost to an edge connected with a node that represents a target object in the next frame and that is closer to a position determined based on the velocity vector and the acceleration vector, and
determines the correspondence by selecting an edge with a low cost preferentially.

6. The tracking apparatus according to claim 2,
wherein the processing circuitry calculates an acceleration vector of the target object detected in the target frame, and
calculates the cost of the edge based on the acceleration vector.

7. The tracking apparatus according to claim 6,
wherein the processing circuitry calculates the cost so as to assign a lower cost to an edge connected with a node that represents a target object in the next frame and that is closer to a position determined based on the velocity vector and the acceleration vector, and
determines the correspondence by selecting an edge with a low cost preferentially.

8. The tracking apparatus according to claim 1,
wherein after the correspondence between the target object in the target frame and the target object in the next frame is determined, the processing circuitry treats the next frame as a new target frame and calculates a velocity vector of the target object detected in the new target frame.

9. The tracking apparatus according to claim 8,
wherein the processing circuitry calculates an acceleration vector of the target object detected in the target frame, and
calculates the cost of the edge based on the acceleration vector.

10. The tracking apparatus according to claim 9,
wherein the processing circuitry calculates the cost so as to assign a lower cost to an edge connected with a node that represents a target object in the next frame and that is closer to a position determined based on the velocity vector and the acceleration vector, and
determines the correspondence by selecting an edge with a low cost preferentially.

11. The tracking apparatus according to claim 1,
wherein the processing circuitry calculates an acceleration vector of the target object detected in the target frame, and calculates the cost of the edge based on the acceleration vector.

12. The tracking apparatus according to claim 11,
wherein the processing circuitry calculates the cost so as to assign a lower cost to an edge connected with a node that represents a target object in the next frame and that is closer to a position determined based on the velocity vector and the acceleration vector, and determines the correspondence by selecting an edge with a low cost preferentially.

13. A non-transitory computer readable medium storing a tracking program for causing a computer to execute:

a graph generation process to generate a tracking graph by setting, as a node, each of a plurality of target objects detected in a plurality of frames constituting video data, creating an edge between two consecutive frames to connect target objects, creating an edge between a node representing a target object detected in an earliest frame and a start node s, creating an edge between a node representing a target object detected in a last frame and a termination node t, and with respect to each edge, calculating a cost of the edge concerned based on a degree of matching between target objects represented by two nodes connected by the edge concerned;

a correspondence determination process to determine a correspondence between a target object detected in the earliest frame and a target object detected in a next frame of the earliest frame by solving a shortest path problem from the start node s to the termination node t in the tracking graph generated by the graph generation process;

a vector calculation process to calculate a velocity vector of a target object detected in a target frame, based on a correspondence between the target object detected in the target frame and a target object detected in a previous frame of the target frame, the target frame being each frame of the plurality of frames starting from the next frame and in a chronological order; and a cost calculation process to calculate a cost of an edge connecting a target object in the target frame and a target object in a next frame of the target frame in the tracking graph, based on the velocity vector calculated by the vector calculation process, wherein the correspondence determination process determines a correspondence between a target object in the target frame and a target object in the next frame, based on the tracking graph and the cost calculated by the cost calculation process.

\* \* \* \* \*